(12) United States Patent
Zheng et al.

(10) Patent No.: US 12,506,556 B2
(45) Date of Patent: Dec. 23, 2025

(54) WEARABLE MICROPHONE JAMMER

(71) Applicant: THE UNIVERSITY OF CHICAGO, Chicago, IL (US)

(72) Inventors: Haitao Zheng, Chicago, IL (US); Ben Zhao, Chicago, IL (US); Pedro Lopes, Chicago, IL (US); Yuxin Chen, Chicago, IL (US); Huiying Li, Chicago, IL (US); Shan-Yuan Teng, Chicago, IL (US)

(73) Assignee: The University of Chicago, Chicago, IL (US)

( * ) Notice: Subject to any disclaimer, the term of this patent is extended or adjusted under 35 U.S.C. 154(b) by 148 days.

(21) Appl. No.: 17/915,234

(22) PCT Filed: Mar. 31, 2021

(86) PCT No.: PCT/US2021/025116
§ 371 (c)(1),
(2) Date: Sep. 28, 2022

(87) PCT Pub. No.: WO2021/202686
PCT Pub. Date: Oct. 7, 2021

(65) Prior Publication Data
US 2023/0131816 A1    Apr. 27, 2023

Related U.S. Application Data

(60) Provisional application No. 63/004,229, filed on Apr. 2, 2020.

(51) Int. Cl.
*H04K 3/00* (2006.01)

(52) U.S. Cl.
CPC .......... *H04K 3/42* (2013.01); *H04K 2203/12* (2013.01)

(58) Field of Classification Search
CPC ....... H04K 2203/12; H04K 3/42; H04K 3/825
See application file for complete search history.

(56) References Cited

U.S. PATENT DOCUMENTS

| | | | |
|---|---|---|---|
| 11,388,510 B2 * | 7/2022 | Craven | H04R 5/027 |
| 2006/0105701 A1 * | 5/2006 | Cornwell | H04K 3/42 |
| | | | 455/99 |
| 2016/0234356 A1 | 8/2016 | Thomas et al. | |
| 2017/0064246 A1 * | 3/2017 | Kline | G11B 20/00086 |
| 2017/0080255 A1 * | 3/2017 | Law | G10K 11/346 |
| 2019/0043471 A1 * | 2/2019 | Maziewski | H04K 3/00 |

(Continued)

OTHER PUBLICATIONS

Fmkit ("40khz mic jammer ultrasonic power LED tester", Youtube, uploaded by fmkit, Oct. 22, 2018, https://www.youtube.com/watch?v=jRFfJd5yMI8) (Year: 2018).*

(Continued)

*Primary Examiner* — Jonathan Malikasim
*Assistant Examiner* — Christopher Richard Walker
(74) *Attorney, Agent, or Firm* — Bell & Manning, LLC

(57) ABSTRACT

A microphone jammer includes a base and a signal generator mounted to the base. The signal generator is configured to generate an ultrasonic signal. The jammer also includes one or more transducers mounted to the base and configured to transmit the ultrasonic signal. The one or more transducers are mounted in a curved layout about the base.

18 Claims, 9 Drawing Sheets

(56) References Cited

U.S. PATENT DOCUMENTS

2019/0122691 A1* 4/2019 Roy .................. H04B 1/04
2019/0216178 A1 7/2019 Perkins et al.

OTHER PUBLICATIONS

Iravantchi et al. ("BeamBand: Hand Gesture Sensing with Ultrasonic Beamforming". In Proceedings of the 2019 CHI Conference on Human Factors in Computing Systems (CHI '19). Association for Computing Machinery, New York, NY, USA, Paper 15, 1-10.) (Year: 2019).*

Nirupam Roy, Haitham Hassanieh, and Romit Roy Choudhury, "Backdoor: Making microphones hear inaudible sounds," In Proceedings of ACM MobiSys, 2017, Jun. 19-23, 2017, Niagara Falls, NY; pp. 1-13. DOI: http//dx.doi.org/10.1145/3081333.3081366.

The International Search Report and the Written Opinion issued on Sep. 10, 2021 for international patent application No. PCT/US21/25116; pp. 1-8.

Chen et al., "Understanding the Effectiveness of Ultrasonic Microphone Jammer," *Associate for Computing Machinery*; Apr. 2019, vol. 1, No. 1, Article; pp. 1-17.

\* cited by examiner

| jammer off | jammer on |
|---|---|
| "now to bed boy" | "it" |
| "it is late and I go myself within a short space" | "space" |
| "most of all robin though of his father what would he council" | |

Fig. 7

WEARABLE MICROPHONE JAMMER

CROSS-REFERENCE TO RELATED APPLICATION

The present application is a National Stage of International Application No. PCT/US21/25116. filed Mar. 31, 2021, which claims the priority benefit of U.S. Provisional Patent App. No. 63/004,229 filed on Apr. 2, 2020, the entire contents of both of which is are incorporated herein by reference.

REFERENCE TO GOVERNMENT RIGHTS

This invention was made with government support under CNS-1923778 and CNS-1705042 awarded by the National Science Foundation. The government has certain rights in the invention.

BACKGROUND

Microphones are electrical instruments that are used to convert sound waves into electrical energy variations that can be amplified, transmitted, recorded, etc. Microphones have numerous beneficial uses such as capturing music for recording, enabling remote audio communications, receiving audio commands for user devices, monitoring an area for unexpected sounds, etc. Microphones come in a wide variety of shapes and sizes, including very small microphones that can be easily hidden. Such small and/or hidden microphones can be used to record individuals without their knowledge, and can potentially be used for illegal or improper activities such as espionage, blackmail, theft, a smear campaign, etc. A microphone jammer is a device that can help prevent such improper use of a microphone. A jammer uses emitted energy waves to interfere with the microphone and prevent the microphone from capturing a clear audio signal.

SUMMARY

An illustrative microphone jammer includes a base and a signal generator mounted to the base. The signal generator is configured to generate an ultrasonic signal. The jammer also includes one or more transducers mounted to the base and configured to transmit the ultrasonic signal. The one or more transducers are mounted in a curved layout about the base. The microphone jammer is formed as (or incorporated into) configurations that are worn on the body or clothes (a wearable microphone jammer) as accessories (bracelets, watches, rings, ear-piercings, etc. and as described herein) or traditional wearable devices (smartwatches, smart wrist bands, smart arm bands, etc. and as described herein).

An illustrative method of forming a microphone jammer includes forming a base. The method also includes mounting a signal generator to the base. The signal generator is configured to generate an ultrasonic signal. The method further includes mounting one or more transducers to the base, where the one or more transducers are configured to transmit the ultrasonic signal, and where the one or more transducers are mounted in a curved layout about the base.

An illustrative wearable microphone jammer includes a base that is configured to attach to a user, an article of clothing, or an accessory. The wearable microphone jammer also includes a signal generator mounted to the base and configured to generate an ultrasonic signal. The wearable microphone jammer further includes one or more transducers mounted to the base and configured to transmit the ultrasonic signal.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

FIG. 7 depicts examples of recognized sentences in scenarios with the proposed wearable jammer turned on and off in accordance with an illustrative embodiment.

DETAILED DESCRIPTION

Figure 1:
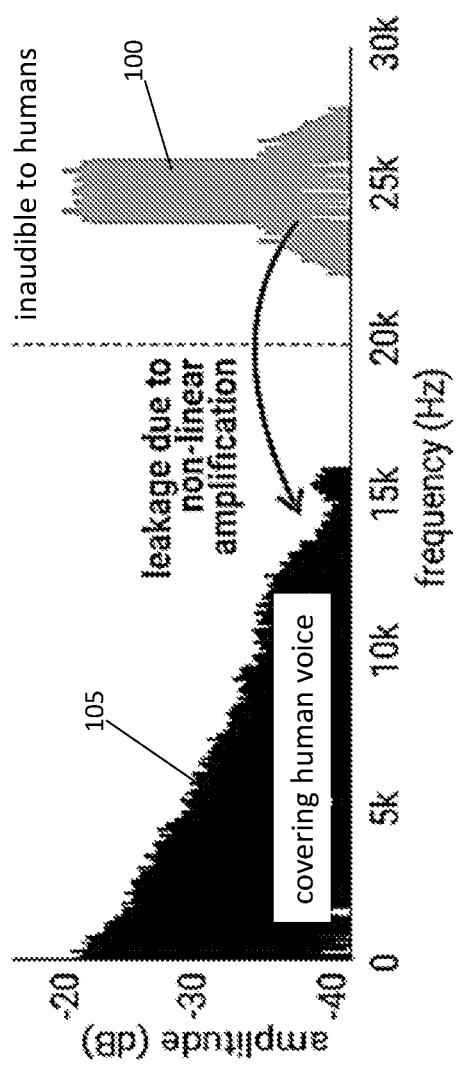
FIG. 1 depicts the concept of ultrasonic jamming in accordance with an illustrative embodiment.

There are numerous voice-based smart devices currently available to consumers. These devices often function as digital voice assistants (e.g., smart speakers, smartphones, smart watches, etc.) that are intended to assist users by providing information and performing tasks. However, consumers are becoming increasingly nervous with the fact that these voice-based devices are, by default, always listening, recording, and possibly saving sensitive personal information. Interactive voice-based assistants appear to only respond to designated wakeup words (e.g., "Alexa," "Hey Google®," etc.), which gives users the impression that all other speech is ignored. However, in reality, these devices have to listen continuously to detect the wake-up words. It has been shown that such devices can monitor and record sounds and conversations in real time, either maliciously, by misconfiguration, or after compromise by attackers. Leaked audio data can be processed to extract confidential information, track user activity, count human speakers, or even extract handwriting content. These negative implications on the security and privacy of end users are significant and unacceptable. To make matters worse, many other acoustic attacks (e.g., turning speakers into microphones, inferring the content of a printed page by recording its printing, inferring the geometry of a 3D object by recording its printing, inferring typed text by listening to key presses, as well as many forms of espionage) rely on eavesdropping via hidden microphones.

One option to help protect user privacy is to simply turn off any devices with audio capturing capabilities prior to having conversations. Unfortunately, it is not always possible for the user to identify all of the audio capturing devices in a given area. For example, some devices may be hidden or too small to be detected.

It is therefore important to build tools that protect users against the potential compromise or misuse of microphones in the age of voice-based smart devices. Microphone jammers aim at empowering users with a tool to disrupt (jam) voice recordings whenever and wherever they want, providing a physical layer of privacy on demand. It has been shown that ultrasonic transducers can prevent commodity microphones from recording human speech. While these ultrasonic signals are imperceptible to human ears (i.e., silent), they leak into the audible spectrum after being captured by the microphones. The leakage is caused by an inherent, nonlinear property of the hardware used to make the microphone.

Researchers have used these concepts to develop ultrasonic speakers, and also jammers that are currently commercially available to the public. However, traditional microphone jamming devices exhibit limitations. First, they are heavily directional, thus requiring users to point the jammer precisely at the location where the microphones are. This is not only impractical, as it may interfere with the user's primary task, but is also often impossible when microphones are hidden from the user. Additionally, traditional jammers rely on multiple transducers that enlarge their jamming coverage, but that also introduce blind spots. These blind spots are locations where the signals from two or more transducers cancel each other out, thus rendering the jammer ineffective in these regions. Such blind spots occur especially in close proximity to the jammer. For example, in traditional jammers, it has been shown that ~17% of all locations within 1.2 meters (m) of a typical multi-transducer jammer are blind spots. If a microphone is placed in any of these locations it will not be jammed, rendering the whole jammer obsolete.

Described herein is a wearable microphone jammer that is designed to overcome the aforementioned limitations of traditional systems. The jammer is designed so that it can be worn by the user. In one embodiment, the jammer can be designed as a bracelet. Alternatively, the jammer can be formed as (or incorporated into) other configurations such as a bracelet, a necklace, a watch, a smart watch, a wrist band, an arm band, an earring, a finger ring, eyeglasses, sunglasses, facial recognition blockers (e.g., radiation blocking glasses), a pin, a clothing button, a hat, a hair tie, a hair barrette, headphones, earbuds, a handbag, a handbag attachment/accessory, or other item of clothing or personal accessory, etc. By turning an ultrasonic jammer into a wearable device, natural movement of the user that occurs while speaking, gesturing, or moving around helps to blur out and eliminate the aforementioned blind spots.

Furthermore, by arranging the transducers in a curved layout, the proposed wearable jammer jams microphones in multiple directions, without requiring the user to manually point the jammer at the eavesdropping microphone(s). A curved layout can refer to one or more rings of transducers, one or more partial rings of transducers, a layout of transducers on a sphere or partial sphere, etc. In an illustrative embodiment, the curved layout is formed by placing one or more transducers on a curved surface such as a sphere, cylinder, cone, etc. Alternatively, the curved layout can be formed by placing one or more transducers on one or more interconnected planar surfaces, such as one or more faces of a cube.

FIG. 1 depicts the concept of ultrasonic jamming in accordance with an illustrative embodiment. An ultrasonic signal 100 is shown to the right of the vertical dashed line (i.e., centered at 25 kiloHertz (kHz) in the ultrasonic frequency range). As shown, the ultrasonic signal 100 leaks to form a leaked signal 105 due to non-linear amplification of the circuit of the microphone. The result is that the leaked signal 105 covers up precisely the spectrum in which the voice is recorded. Thus, ultrasonic jamming is possible because the higher-frequency signals, after being captured by the non-linear diaphragm and power-amplifier of a microphone, will create a lower-frequency 'shadow' that happens to be in the filtering range of the microphone (i.e., the audible range of the microphone). The fundamental exploit is due to the fact that acoustic amplifiers are only linear around the audible frequency range, while outside of the range (e.g., ultrasound), the response of the amplifier exhibits non-linearities. This leakage from the ultrasound range to the audible range adds so much audible noise on the microphone circuitry that it effectively renders voice recordings unusable. Ultrasonic jamming can be performed using amplitude modulation (AM) or frequency modulation (FM), depending on the embodiment.

Figure 2A:
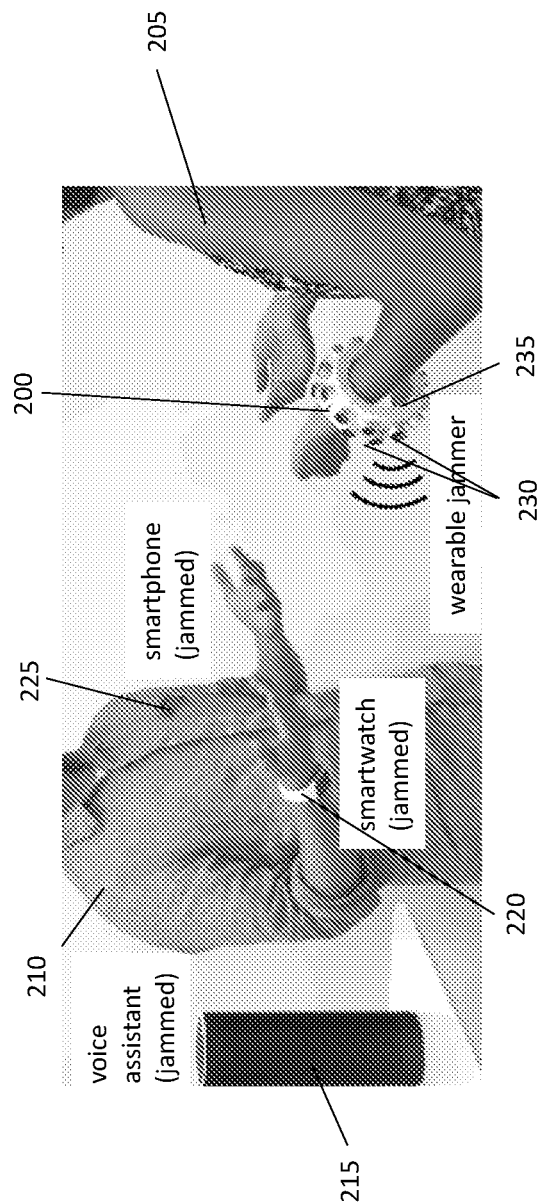
FIG. 2A depicts a wearable jammer that is being worn during a conversation in accordance with an illustrative embodiment.
Figure 2B:
FIG. 2B depicts the actual audio corresponding to a conversation between a user of the wearable jammer and another individual in accordance with an illustrative embodiment.
Figure 2C:
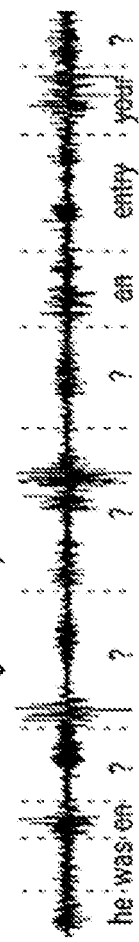
FIG. 2C depicts a transcript of the conversation as captured by a speaker voice assistant, a smart watch, and a smartphone in the presence of the wearable jammer in accordance with an illustrative embodiment.

FIG. 2A depicts a wearable jammer 200 that is being worn during a conversation in accordance with an illustrative embodiment. The wearable jammer 200 is in the form of a bracelet and is being worn by a user 205. The user 205 is speaking with an individual 210 in the presence of a speaker voice assistant 215. In addition, the individual 210 is wearing a smart watch 220 and has a smartphone 225 in his pocket. As shown, the wearable jammer 200 includes a plurality of transducers 230 that are mounted around the perimeter of a circular base 235. In alternative embodiments, a different configuration, type, and/or size of the transducers may be used. FIG. 2B depicts the actual audio corresponding to the conversation between the user 205 and the individual 210 in accordance with an illustrative embodiment. FIG. 2C depicts a transcript of the conversation as captured by the speaker voice assistant 215, the smart watch 220, and the smartphone 225 in the presence of the wearable jammer 200 in accordance with an illustrative embodiment. As shown in FIGS. 2B and 2C, use of the wearable jammer 200 essentially made the captured conversation unintelligible as compared to the actual words spoken.

As discussed in more detail below, it has been shown by a series of technical evaluations and a user study that the proposed ultrasonic microphone jammer is superior to stateof-the-art and commercial stationary jammers. The evaluations and study demonstrated that the proposed wearable jammer outperformed static jammers in jamming coverage, that the jamming is effective even if the microphones are hidden and/or covered by various materials, such as cloths or paper sheet, and that in life-like situations individuals believe that the proposed wearable jammer protects the privacy of their voice.

The proposed microphone jammer was designed to have a wearable form factor, which effectively jams in more directions around the user than existing approaches. In one embodiment, the wearable microphone jammer can be in the form of a bracelet so that it can be easily activated whenever the user decides to engage in a private conversation. Having the device within reach of the user at all times provides them with the continuous ability to activate and user the jammer, ensuring the user is the one in control.

Figure 3B:
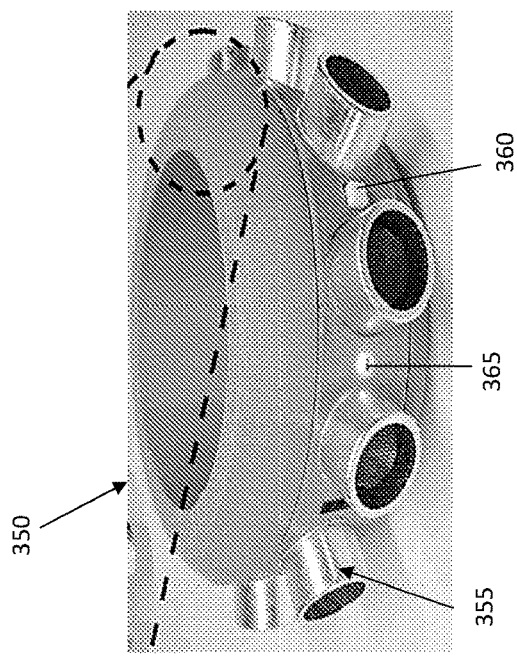
FIG. 3B is a perspective view of a wearable jammer in accordance with another illustrative embodiment.
Figure 3A:
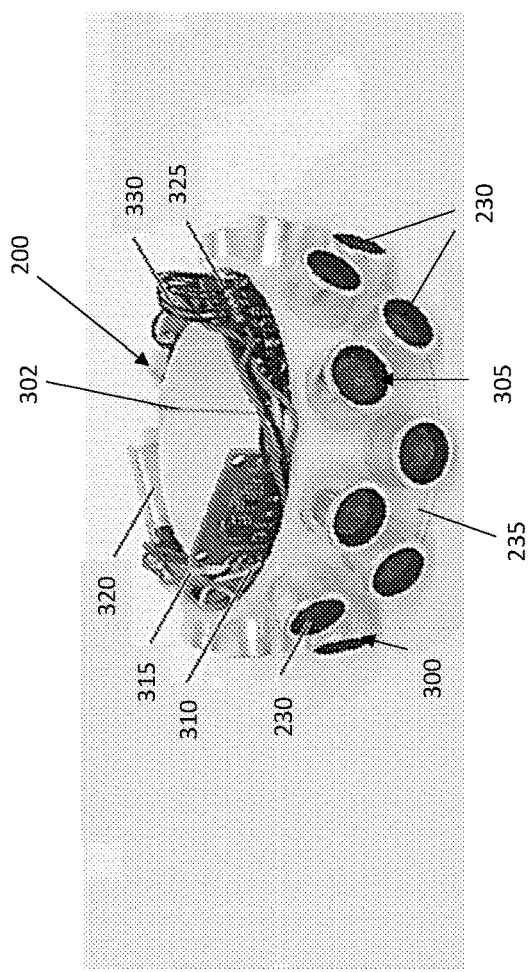
FIG. 3A is a perspective view of the wearable jammer in accordance with an illustrative embodiment.

FIG. 3A is a perspective view of the wearable jammer 200 in accordance with an illustrative embodiment. The wearable jammer 200, which is a prototype, is a self-contained wearable device that includes the circular base 225. The depicted prototype device was constructed and used to conduct testing and analysis to demonstrate proof of the concepts described herein. The test and analysis results are described below. The prototype device, while functional, is not intended to be limiting with respect to the form factor or appearance of the proposed wearable jammers described herein. Rather, the device can be constructed using any of the form factors described herein, and a market ready product can be significantly smaller and more aesthetically appealing than the depicted prototype.

In one embodiment, the circular base 225 can be a 3D-printed 9 centimeter (cm) curved layout in the form of a ring (outer diameter) with a slit that acts as a hinge 302, allowing the wearer to open up the bracelet and fit it around his/her arm. In alternative embodiments, a different size and/or shape may be used for the base. For example, in embodiments in which the wearable jammer is not a bracelet, the base can take the form of a piece of clothing, a clothing button, a necklace or portion of a necklace, an earring or a portion of an earring, etc. Thus, in some embodiments the base is directly attachable to or worn by the user. In other embodiments, the base can include a mount that allows the base to be attached to the user. The mount can be in the form of one or more magnets that magnetically attach to the user, a pin that the user attaches to his/her clothing, an adhesive, an article of clothing that receives the base, etc.

The wearable jammer 200 also includes the transducers 230. In one embodiment, 23 ultrasound transducers (e.g., NU25C16T-1, 25 kHz) can be used, and these transducers can be positioned in 2 circular patterns (or other curved layouts) on the exterior surface of the circular base 225. In such an implementation, a lower circular pattern (or curved layout) 300 can include 12 transducers and an upper circular pattern 305 can include 11 transducers. As shown, transducers in the lower circular pattern 300 are staggered relative to transducers in the upper circular pattern 305. In embodiments without a hinge, 12 transducers can be used on both the upper circular pattern and on the lower circular pattern. In alternative embodiments, a different number, type, and/or placement of the transducers may be used. For example, in one embodiment the base can be a sphere or partial sphere, and the transducers can be positioned in rings or otherwise about the surface of the sphere. In a further embodiment, the ultrasonic transducer can be a piezoelectric film, an organic piezoelectric film, a conformable piezoelectric array, a piezo-electric ceramic which may be embedded into a polymer, or a capacitive micromachined ultrasonic transducer (CMUT). In a further embodiment, the ultrasound transducer(s) can be a linear array, sector array, curvilinear (curved) array, 2-D array (rectangular or annular) or phased array (1D or 2D).

The wearable jammer 200 also includes a low-power signal generator 310 (e.g., AD9833, up to 12.5 MHz with 0.004 Hz programmable steps), a microcontroller 315 (e.g., an ATMEGA32U4 microprocessor), an optional LED status indicator (not shown), a tactile or other switch (not shown) for activating the jammer, a battery 320 (e.g., a LiPo battery (e.g. 3.7V, 500 mAh)), an audio amplifier 325 (e.g., a 3 Watt (W) audio amplifier (PAM8403)), and a power regulator 330 (e.g., a 3.7 Volt (V) to 5 V step-up regulator). In an illustrative embodiment, the microprocessor controls the signal generator via a Serial Peripheral Interface. In another illustrative embodiment, a memory or other computer storage is incorporated into the microcontroller 315. Alternatively, the memory can be a separate component in communication with the microcontroller 315. In alternative embodiments, a different number and/or configuration of components may be used to form the wearable jammer 200.

In an illustrative embodiment, the wearable jammer 200 generates an ultrasound jamming signal via the signal generator 310, which can be an AD9833 sine wave generator. Alternatively, a different type of signal generator may be used. The integrated circuit (IC) of the signal generator 310 produces a pure sine wave at a desired frequency (e.g., up to 12.5 megaHertz (MHz)). To select a frequency for the sine wave, the signal generator 310 can be controlled using the microcontroller 315. In order to jam effectively, signals having a range of frequencies can be generated. According to the principles of ultrasonic jamming, each of these signals will produce a shadow at an audible frequency. Therefore, using multiple frequencies enhances jamming. In one embodiment, the signals are generated by sweeping the frequency of the sine wave randomly between 24 kHz to 26 kHz (e.g., 25 kHz #1 kHz) in steps of 1 Hz, and the sine wave frequency can change every 0.45 milliseconds (ms). In one implementation, a 92 kHz wave player integrated circuit (IC) was employed to play back the white noise (25 kHz+1 kHz). However, it was found via empirical testing that a randomly-sweeping sine wave yielded the same jamming power as the white noise with significantly less power consumption than the overly complex wave-player IC. In alternative embodiments, different frequency ranges, different frequency steps, and/or a different period of time between changes in frequency may be used. For example, the frequency of the sine wave can be any frequency greater than 20 kHz, and the steps in frequency changes can be 0.1 kHz, 0.3 kHz, 0.5 kHz, 0.75 kHz, 1.5 kHz, 5 kHz, etc. Additionally, the period of time can be 0.1 ms, 0.25 ms, 0.35 ms, 0.4 ms, 0.5 ms, 0.75 ms, etc.

The generated signal is amplified using the audio amplifier 325, which can be a 3 W amplifier (PAM8403) in one embodiment. Alternatively, a different type and/or size of audio amplifier may be used. It is noted that the amplifier can be set to operate below maximum amplification. This reduces overall power consumption and preserves signal quality due to the lower distortion. When measured directly at any of the transducers, the loudness of the proposed device is around 92.3 A-weighted decibels (dBA). In alternative embodiments, a different loudness value may be used. In some embodiments, the audio amplifier 325 can be used to introduce variable amplitude into the generated signals to produce some or all of the jamming effects. The amplitude modulation can be used as an alternative to frequency modulation, or in combination with frequency modulation, depending on the embodiment.

FIG. 3B is a perspective view of a wearable jammer 350 in accordance with another illustrative embodiment. The wearable jammer 350 includes a single ring of transducers 355 positioned about its perimeter. The wearable jammer 350 includes a button 360 that is used to activate the device. The wearable jammer 350 also includes a light-emitting diode (LED) light 365 that is used to indicate whether the device is activated or deactivated. Similar to the wearable jammer 200, the wearable jammer 350 can similarly include a signal generator, microcontroller, battery, amplifiers, etc. In alternative embodiments, a wearable jammer can include more than one signal generator, microcontroller, battery, amplifier etc.

In one implementation, the prototype wearable jammer device consumes approximately 0.47 W (3.7 V×127 milli-Amps (mA)) when jamming, which is ten times less energy than that used by the commercially available i4 jammer. Thus, the proposed device can continuously jam for around four hours or more on a 500 mA battery. The prototype device and battery weigh 135 grams. In alternative embodiments, a different size battery (e.g., 100 mA, 250 mA, 750 mA, 1000 mA, etc.), or number of batteries, may be used, which will result in a different weight of the device. Additionally, the battery (or batteries) included in the wearable jammer device can be rechargeable, such as lithium-ion batteries, nickel cadmium batteries, nickel-metal hydride batteries, etc. In such an embodiment, the wearable jammer device can include a port to receive a power cord that delivers power to charge the battery or batteries. The power can originate from a wall outlet or other source. The wearable jammer device can also include battery charging hardware/software to safely charge the battery and prevent overcharging. In an alternative embodiment, a wireless battery charging system can be incorporated into the wearable jammer device. In another alternative embodiment, the power source of the wearable jammer device can be disposable and replaceable by the user.

The proposed device has been designed with several key elements that allow it to outperform state-of-the-art microphone jammers. The proposed device utilizes multi-directional jamming via a curved layout of the transducers. Existing microphone jammers, such as the i4, embed their ultrasonic transducers in a flat (one-dimensional (1D) or two-dimensional (2D)) layout. As a result, these jammers are effective only when the user points them at the target microphone. This is disadvantageous because it requires the user to steer the device, making the jamming action a primary task. Additionally, it is practically impossible to use against hidden microphones because the user does not know where to aim the device. Conversely, the proposed wearable jammer device features all of its ultrasonic transducers in a curved layout, effectively enabling jamming in multiple directions on a plane. It is demonstrated herein that the proposed design is superior to traditional systems with respect to both simulations and experimental evaluations.

The proposed device also reduces blind spots by leveraging naturally-occurring movements of the wearer. A significant benefit of a microphone jammer as a wearable device is that movement of the user while using the device can help to mitigate the traditional blind spot problem, which affects all transducer arrays. While a user is wearing the jammer device, the device is (in general) being moved as the user walks, gestures, points, types, nods, etc. It is precisely these movements that are leveraged to reduce blind spots, because as the device moves in space the signal emission map moves accordingly and creates new areas of increased signal strength that blur out the blind spot areas. In one embodiment, the wearable jammer can include a servo motor to provide movement of the jammer in addition to the movement introduced by the user.

Another design element that makes the proposed wearable design superior is its ubiquitousness relative to the user. A wearable jammer is collocated with the user that it protects, whereas stationary jammers need to be installed or moved around in every space the user inhabits. Furthermore, the short distance between the jammer and the mouth of the speaker prevents the use of beamforming microphone arrays to separate the signals of the human speaker and the jammer, making the wearable jammer a stronger defense as compared to traditional systems.

In order to validate that the proposed wearable microphone jammer outperforms existing approaches, simulations and experimental evaluations were conducted. Additionally, a user study was conducted in an effort to understand how participants perceive the effectiveness of the proposed wearable jammer device. Described below are the different validations performed, along with an overview of the simulations, experiments, and study.

Prior to creating a prototype of the proposed jammer, it was confirmed by way of simulation that a wearable jammer with ultrasound transducers in a curved layout reduces blind spots when compared to stationary jammers with planar-layouts. To do so, the power of an ultrasonic signal in space after it leaves the transducer was simulated. In the simulations, it was found that (1) jammers with transducers in a planar layout jam mostly in one direction; (2) on the contrary, positioning the transducers in a curved layout increases jamming in multiple directions; and, (3) adding small (simulated) movement, which occurs naturally in a wearable device, results in a blind spot reduction, similar to what can be achieved using more complex control techniques with multi-frequency signals. These findings were critical because they allow the design of the device and circuit to be simple (i.e., using a single signal source), which reduces power consumption and makes the device compatible with a wearable form factor. Additionally, the simulations showed that the proposed approach does not sacrifice jamming quality when compared to a more complex and hardware heavy approach (e.g., using multiple signal sources). These simulated findings informed how the prototype was created. The prototype was used in all subsequent experiments and the user study.

The aforementioned simulation focused on determining the extent to which jammers based on planar transducer layouts (e.g., i4) are directional, determining the extent to which blind spots affect a jammer with its transducers in a curved layout, and determining how the blind spots behave with respect to small movements of the jammer device. The simulations were conducted using Matlab®.

Generally speaking, the simulation computed the propagation of ultrasound from the sources to all points around the device. To model the directivity of the transducers, the piston model was utilized as a good approximation to the pattern supplied by the datasheet from the manufacturer. The transducers are designed to operate at a central frequency of 25 kHz, and the control technique sweeps the frequency of a sine wave randomly between 24 kHz to 26 kHz in steps of 1 Hz, every 0.45 ms. To simulate multiple signal sources, different random seeds were used in the generation of random frequency sweeping of each source. To simulate a planar jammer, a 3×3 array design was used, which featured 9 transducers in a 3×3 planar grid. For the curved-layout, the transducers were placed in a ring having a diameter of 11 cm. The simulation was run at 96 kHz, i.e., larger than the Nyquist rate for 25 kHz. It is noted that the simulation did not account for signal reflections.

The simulation algorithm is described below. The set of transducers in a jammer can be referred to as S, and each individual transducer can be referred to as s, such that s E S. Transducers were modeled as a piston source of radius r=8.2 mm. The variable T refers to the time sampled in the simulation, with each time step referred to as t, such that t ∈ T. The variable Pref represents the reference pressure of the transducers, k is the wavenumber (k=ω/$c_o$), d (p, $p_s$) is the distance between the transducer and the point, q is the angle between the normal of the transducer and the point, $J_1$ represents a Bessel function of the first kind, and $f_s(t)$ represents the signal s transmitted at time t.

Given the model of the transducer, the complex acoustic pressure $P_{s,t}(p)$ contributed by each transducer s at a given position p and time t is computed as:

$$P_{s,t}(p) = \frac{P_{ref}}{d(p,p_s)} \cdot \frac{2 \cdot J_1(k \cdot r \cdot \sin\theta)}{k \cdot r \cdot \sin\theta} \cdot f_s\left(t - \frac{d(p,p_s)}{c_0}\right) \quad \text{Eq. 1}$$

The total far field generated by all the transducers at time t can be computed as the summation of the contribution of each individual transducer $P_t(p) = \Sigma_{s \in s} P_{t,s}(p)$. Also, the average far field generated over time can be computed as the root mean square of the contribution of each time step $$\overline{P(p)} = \sqrt{\frac{1}{|T|} \cdot \sum_{s \in S} P_t(p)^2}.$$

A total of 0.4s (roughly the average duration of a human spoken word) was simulated with 13.573 millisecond (ms) time gaps in between each sample, up to a 1-meter radius around the jammer. To simulate a moving jammer, the position and orientation of each transducer were updated at each sampled time step, and the aforementioned process was repeated to conduct the simulation. To simulate a small movement, all transducers were rotated by 15 degrees in 400 ms time steps to depict a relatively small gesture of the wrist turning right.

Figure 4A:
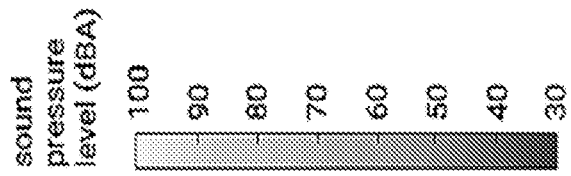
FIG. 4A depicts simulation results from a planar jammer in accordance with an illustrative embodiment.
Figure 4A:
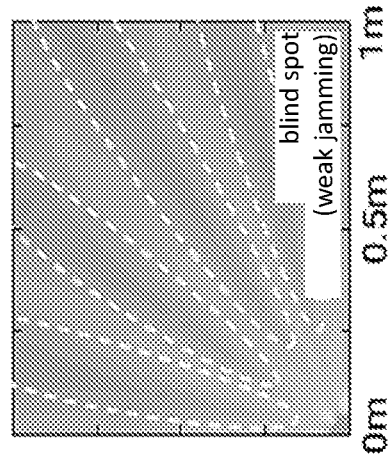

Four 3D simulations were conducted, and these simulations demonstrated that a wearable jammer outperforms existing, planar or stationary, jammers. These are all depicted in FIG. 4. In FIG. 4, for the sake of visual clarity, only a 90° range of a 2D cross-section of the power distribution centered around the jammers is plotted. FIG. 4A depicts simulation results from a planar jammer in accordance with an illustrative embodiment. This planar configuration is the design used in all known traditional microphone jammers. As shown, the planar jammer has a rather limited angle of coverage around the jammer, suggesting that planar jammers are mostly directional.

Figure 4B:
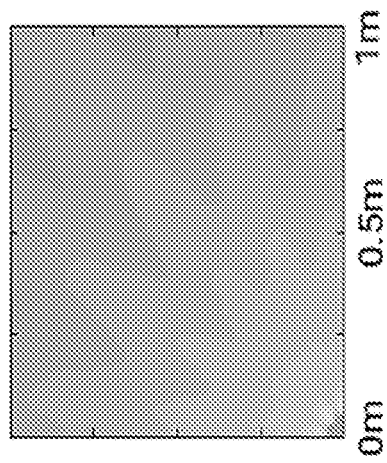
FIG. 4B depicts simulation results from a jammer with a 9 transducer curved layout in accordance with an illustrative embodiment.

FIG. 4B depicts simulation results from a jammer with a 9 transducer curved layout in accordance with an illustrative embodiment. It was observed that, when compared to planar layouts, the proposed jammer with the curved layout radiates in all directions, with stronger components in the horizontal plane aligned with the transducers. However, the appearance of the blind spots between transducer pairs was also observed. These blind spots develop in zones where the transducer signals cancel each other out. These well-known blind spots are a key disadvantage of any multi-transducer jammer because a microphone placed within a blind spot is unlikely to be jammed since the jamming signal intensity is weak.

Figure 4C:
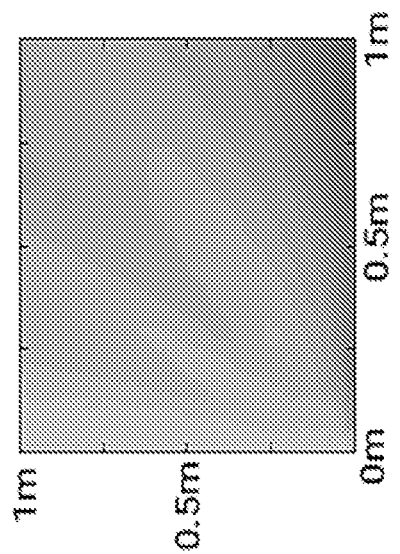
FIG. 4C depicts simulation results from a jammer with a curved layout and independent signal generators in accordance with an illustrative embodiment.

One way to mitigate blind spots is to utilize a large number of out-of-phase sources. For instance, if one scales up to 9 independent signal generators it would limit phase collisions and thus reduce blind spots. This configuration was simulated and FIG. 4C depicts simulation results from a jammer with a curved layout and independent signal generators in accordance with an illustrative embodiment. As shown, a smooth radiation pattern was observed around the center, which is ideal for jamming. However, this approach can increase the number of components utilized to manufacture this design (e.g., 9 signal generators and 9 amplifiers (one per transducer)).

Figure 4D:
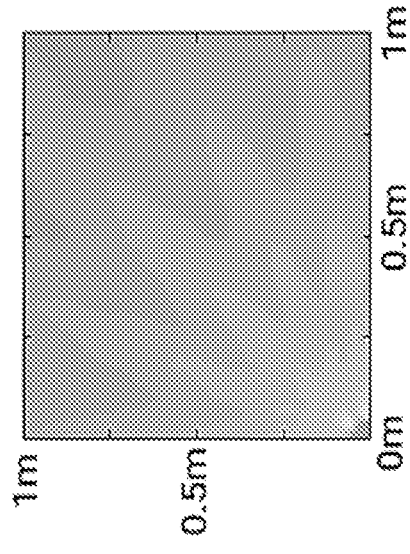
FIG. 4D depicts simulation results from a wearable microphone jammer device in accordance with an illustrative embodiment.

The simulation results led to the development of a wearable implementation that mitigates the blind spots using only one signal source and one amplifier. FIG. 4D depicts simulation results from a wearable microphone jammer device in accordance with an illustrative embodiment. As discussed herein, a wearable device will move in space alongside the user. To simulate this movement, the jammer was turned by 15 degrees during the 400 ms of the simulation, which simulates what would occur when the wrist of the user turns to the right slightly. As shown in FIG. 4D, the result is a smooth radiation map, containing almost no blind spots. The simulation thus helped form the blueprint for the proposed wearable jammer.

A first experiment evaluated the angular power distribution of the proposed device. Specifically, the angular power distributions of the proposed wearable jammer and 2 existing devices (a planar jammer with 9 transducers and a commercially available i4) were measured. As discussed below, it was found that the proposed device provides a wide-spread angular coverage (mean (M)=−3.3 dBA, standard deviation (SD)=1.6d BA), while the existing jammers are highly directional (planar jammer: M=−19.2 dBA, SD=8.5 dBA; 14: M=−17.0 dBA, SD=6.8 dBA).

A second experiment evaluated the effectiveness of the device at jamming speech recognizers. To determine effectiveness, the proposed device was used to a jam speech recognizer at different angles and the word error rate (WER) was determined. The WER was also determined for the planar jammer and the i4. It was found that the proposed wearable device jams more effectively in multiple directions with an increased word error rate (WER) when compared to the other jammers (the proposed wearable: M=96.59% WER, standard deviation (SD)=3.97%; planar jammer: M=38.89% WER, SD=21.72%; i4: M=57.55% WER, SD=35.04%).

A third experiment tested the ability of the device to jam microphones when the microphones are covered by everyday materials (e.g., hidden microphones inside boxes, behind clothes, etc.). This experiment stems from a unique feature of the proposed device in that it does not require pointing at the target microphone. It was found that the proposed device jams microphones hidden under a variety of objects, such as ordinary cloths, foam-based microphone windshields, and paper sheets, with a word error rate above 97%.

Additionally, a user study was conducted to evaluate whether wearing the proposed jamming device impacted the perception of privacy of the user. In the study, groups of participants were asked to engage in life-like conversations while they wore the bracelet one at a time. It was found that participants felt that the wearable jammer device protects their privacy (M=5.4 out of 7, SD=1.1).

Referring now to the first experiment, the angular power distribution (i.e., the power emitted at different angles) of the wearable device was measured and compared to a planar 3×3 jammer and a commercially available i4 jammer. The i4 jammer includes two perpendicular rows of ultrasonic transducers, with five transducers on the side and two on the top. From a spectral analysis, it was determined that the i4 operates at the low end of ultrasonic frequency (20-24 kHz), which allows its signals to travel further with slightly less power drop. However, it was noticed that the i4 produces some disturbing audible sounds, which are likely due to signal leakage in its transducers resulting from the 20 kHz signals. The i4 device weighs 380 grams and consumes 4.2 W of power. When measured directly at the transducers (with a sound pressure meter), the loudness of the i4 is around 92.4dBA. The planar jammer used in the experiment is an array of nine ultrasonic transducers in a 3×3 configuration. The planar jammer was built with precisely the same transducers and amplifier as the wearable jammer. The planar jammer used in the experiment operates at 25 kHz+1 kHz (the same signal as the proposed device) and is completely inaudible. When measured directly at the transducers, the loudness of the planar jammer is around 92.6 dBA. The proposed wearable jammer was moved using a servo motor, and the servo motor was programmed to move 15° in 400 ms. When measured directly at the transducers, the loudness of the prototype was approximately 92.3 dBA.

To measure the angular power distribution of all three devices, the jammers were placed on a table, one at a time. All angles from 0° to 180° around the jammers were measured at a distance of one meter, in steps of 5°. This angle can be referred to as a. To obtain an accurate power measurement, an HT-80A sound level meter was used, which includes a well-calibrated microphone. When measuring the wearable jammer, the average of the minimum and maximum power measured at each angle was used.

Figure 5:
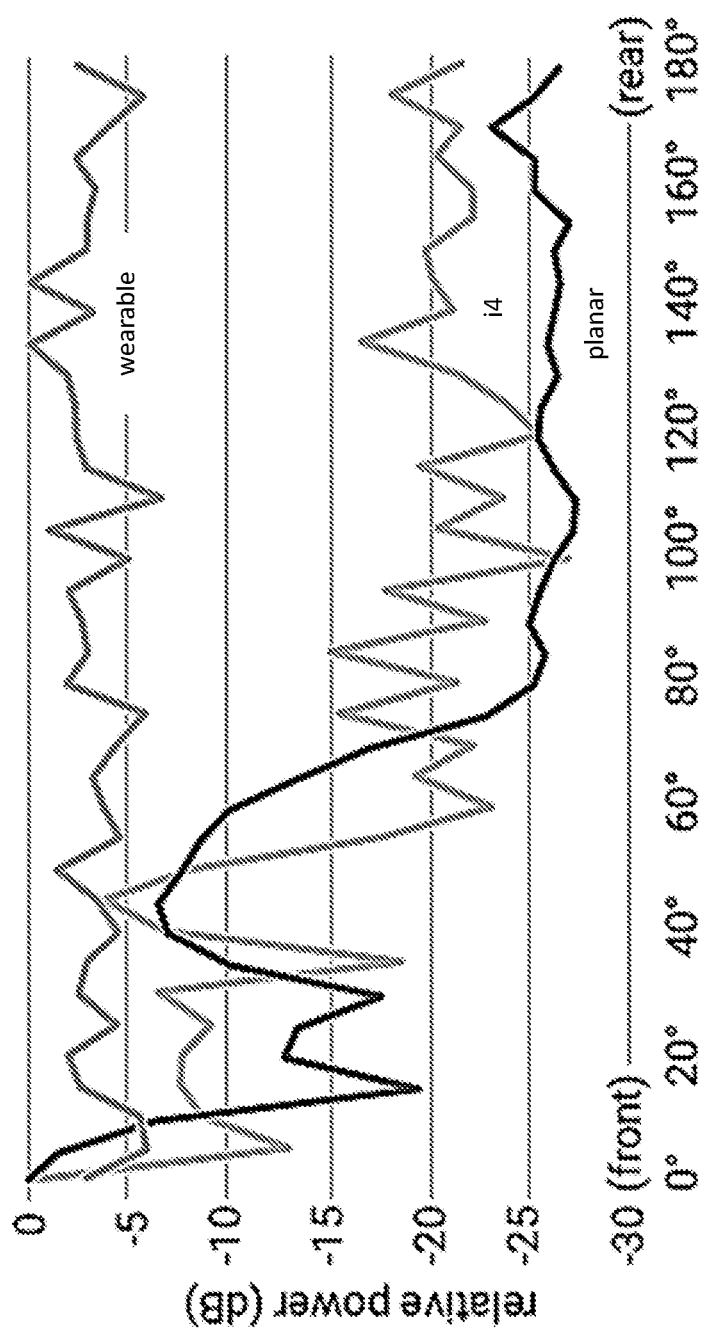
FIG. 5 depicts the angular power distribution measured for the wearable jammer, planar jammer, and i4 jammer in accordance with an illustrative embodiment.

FIG. 5 depicts the angular power distribution measured for the wearable jammer, planar jammer, and i4 jammer in accordance with an illustrative embodiment. These real world measurements of the angular coverage (in terms of the signal power as the jammer-to-microphone angle increases from 0° to) 180° are normalized by the maximum power of each jammer. As discussed above, it was found that the proposed jammer device provides a wide-spread angular coverage (M=−3.3 dBA, SD=1.6 dBA), while the existing jammers are highly directional (planar jammer: M=−19.2 dBA, SD=8.5 dBA; 14: M=−17.0 dBA, SD=6.8 dBA).

Furthermore, in the case of a planar jammer and the i4, even within the angular sector of [0°,40°], a subtle angle change of 2° leads to a 5-10 dBA drop in their jamming power. This uneven distribution is due to the aforementioned blind spot problem. Conversely, the power of the proposed wearable jammer has no dramatic drops across all angles, as the movement helps to blur out the blind spots.

In the second experiment, an end-to-end evaluation of jamming effectiveness was conducted for each of the 3 jammers discussed above. The evaluation was based on the measured ability of state-of-the-art speech recognizers to extract text from recordings of microphones jammed using the 3 jammer devices. The jamming of these devices was tested at multiple angles from 0° to 180°, in steps of 10° and always 1 meter away from the jammer. This experiment used the built-in microphones of a Nexus 6 smartphone.

To create a comparable experiment across multiple devices and angles, one cannot rely on a human speaker. Even a trained public speaker that would not make any pronunciation mistakes, would still introduce confounding variables into the measurements as their voice would not be perfectly replicable across multiple trials. For example, the loudness (dBAs), direction, timbre, etc. of the voice may change between trials. Therefore, prerecorded speech was played back using a speaker having a frequency response from 180 Hz-20 kHz. The speaker was calibrated so as to play the pre-recorded human speech at a standard sound level of human conversation (e.g., ~55-66 dBA measured at Im away). The recorded speeches used in the experiment were ten 1-minute long sentences taken, at random, from a speech dataset that is commonly used by speech recognition researchers. For each trial, the pre-recorded speech was played back via the speaker and recorded with the microphone. These recordings were then fed into a speech recognizer.

To compute the effectiveness of the jammers, the output of the recognizer was compared to the transcript of each sentence in the dataset (ground truth). This results in the percentage of the words that were incorrectly transcribed by the text-to-speech, which is denoted as the Word Error Rate (WER) and is a common metric in speech processing.

Figure 6:
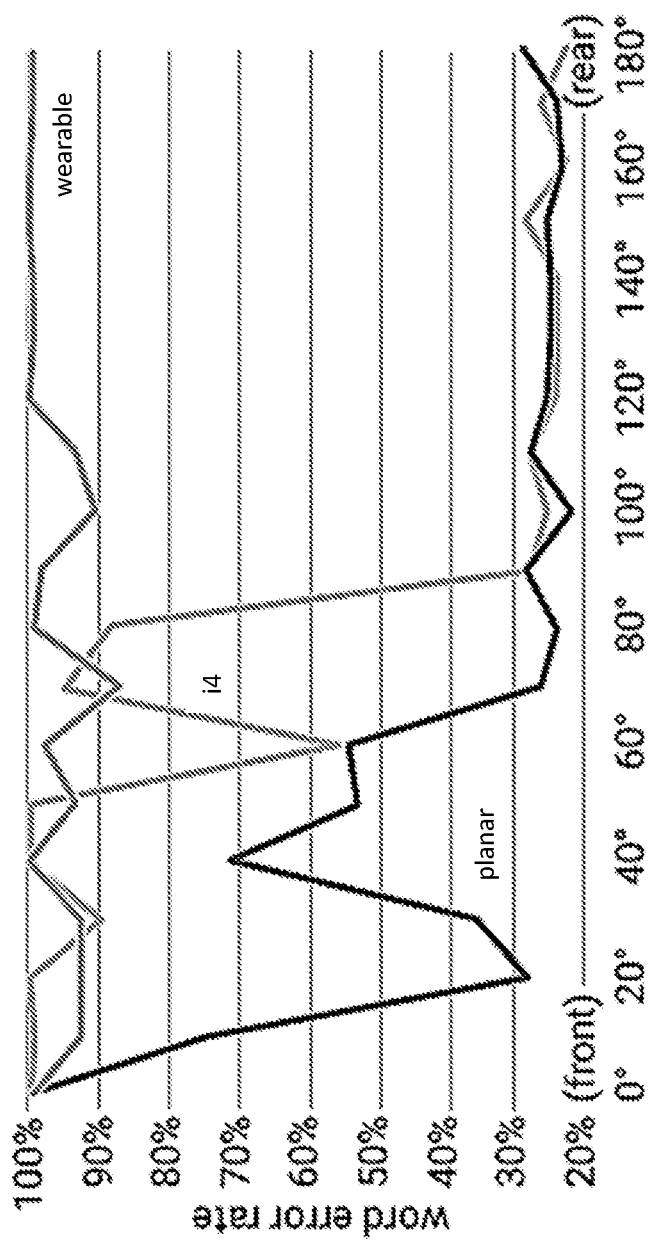
FIG. 6 depicts word error rate of speech recognition performed in the presence of the wearable jammer, the planar jammer, and the i4 jammer in accordance with an illustrative embodiment.

FIG. 6 depicts word error rate of speech recognition performed in the presence of the wearable jammer, the planar jammer, and the i4 jammer in accordance with an illustrative embodiment. As discussed above, it was found that the proposed wearable device jams more effectively in all directions (M=96.59% WER, SD=3.97%) than the existing devices (planar jammer: M=38.89% WER, SD=21.72%; i4: M=57.55% WER, SD=35.04%). While different microphones were used to capture the played back speech, the measurements did not reflect much difference between the measurements obtained from the different microphones. As a result, FIG. 6 depicts an average of the results from the different microphones. Furthermore, it is noted that even without jamming, no text-to-speech system is perfect. In this experiment, a WER of 30% for the speech recognizer was measured in the absence of jamming.

The second experiment indicates a similar pattern to the angular power distribution found in the first experiment. As depicted in FIG. 6, both the planar jammer and 14 exhibit WER drops at 30° and 60°, around their blind spots. On the contrary, the proposed wearable jammer maintained a high WER throughout the measured angles. Additionally, a severe drop in WER was observed for the planar jammer and the i4 jammer when the microphone was placed more than 90° away from the jammer (planar jammer: M=26.30%, SD=2.16%; i4: M=26.14%, SD=2.07%; the wearable jammer: M=97.92%, SD=3.40%). This confirms that existing jamming approaches are highly directional. This result also confirms that the proposed approach is effective even when not pointing directly at the target device.

FIG. 7 depicts examples of recognized sentences in scenarios with the proposed wearable jammer turned on and off in accordance with an illustrative embodiment. In FIG. 7, the blank in the third row indicates that no words were recognized from that sentence. By contrasting the output of the text-to-speech system when fed the jammed recording vs. the clean recording, it was observed that most words became unrecognizable.

As observed in the second experiment, the wearable jammer has a wide angular coverage. Thus, wearable jammer efficiently performs jamming even without the user aiming the jammer at the target microphone. This feature allows the wearable jammer to also jam microphones that are hidden or otherwise not apparent to the user. The third experiment evaluated whether this type of ultrasonic jamming is effective when the microphone is covered with a variety of materials, as it likely would be in the case of a hidden microphone.

In the third experiment, the second experiment was repeated using the proposed wearable jammer, except this time the microphones were covered with different materials. Specifically, a plastic bag (0.2 mm thick Polyethylene), a plastic box (1 mm thick polypropylene), a paper sheet (from a 20 pound (lb) set), a paper tissue (3-ply tissue), a cardboard box (3 mm thick), a cloth (cotton T-shirt), and two windshields (one fur and one foam) typically used in professional audio recordings were used to cover the microphone and test the effectiveness of the wearable jammer. Additionally, a baseline was also recorded with no blockage applied.

Figure 8:
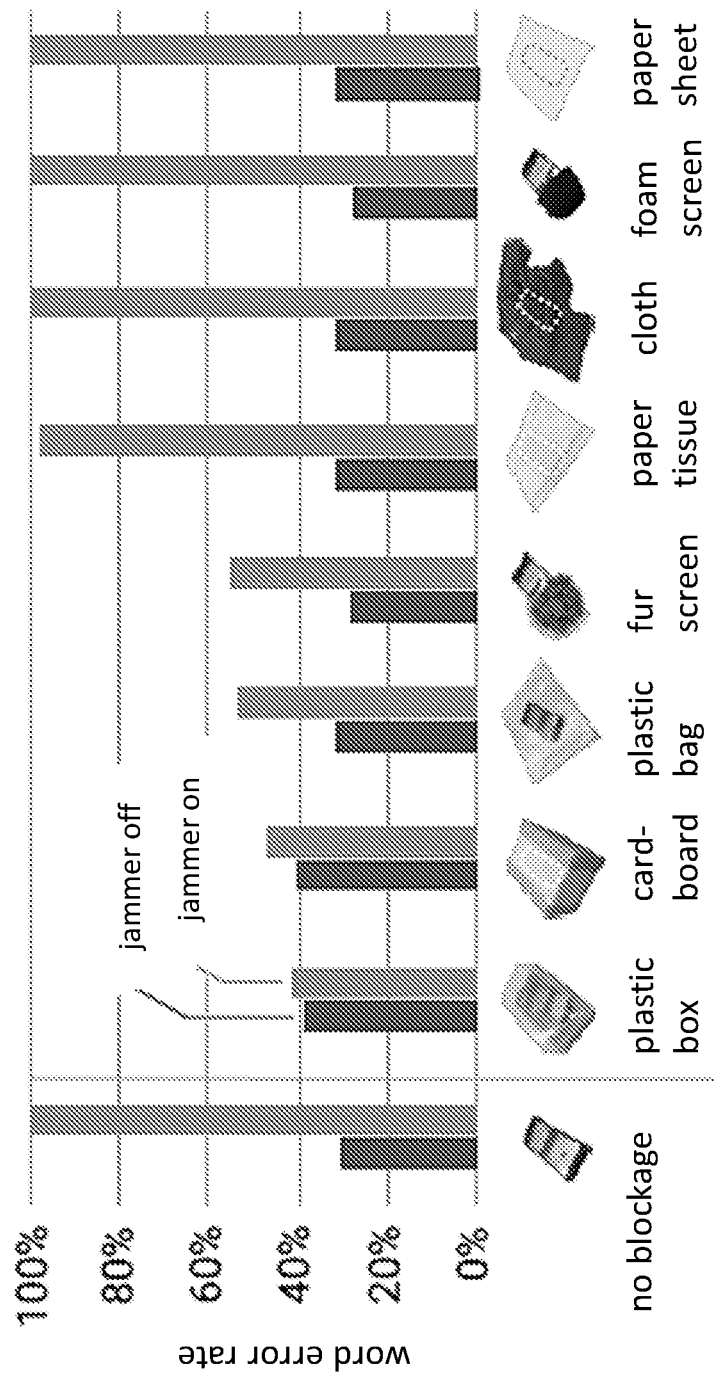
FIG. 8 depicts speech recognition results as average word error rate when the microphone is covered up with various objects in accordance with an illustrative embodiment.

FIG. 8 depicts speech recognition results as average word error rate when the microphone is covered up with various objects in accordance with an illustrative embodiment. It was found that the paper tissue, paper sheet, foam windshield, and cloth had little impact on jamming performance, resulting in an WER of 99%. In other words, the proposed wearable jammer was able to jam microphones hidden by these materials and only 1% of the words were correctly transcribed by the text-to-speech recognizer. Conversely, in the absence of the jammer, the text-to-speech recognizer recovered more than 60% of the words.

If the microphone was covered by a plastic box or a cardboard box, it was observed that the jamming performance dropped to WER 41.01% and 46.76%, respectively. In these two scenarios, an increase of the WER was observed even in the absence of jamming up to 38.13% and 40.29% respectively. Thus, it was determined that materials such as paper, cloth, and foam have little impact on jamming performance, while thicker or more complex blockage materials (e.g., plastic box, fur windshield, etc.) may decrease the jamming performance. This result is not a limitation of the proposed wearable design, but is a limitation of acoustic jamming in general, since ultrasonic waves are reflected/absorbed differently from those at the audible spectrum for a given material.

Referring now to the user study, this study was performed to understand whether wearing the proposed jammer impacts the feeling of privacy for the user. To conduct the study, participants were asked to engage in group conversations that lasted four minutes. Neither the topic nor the volume of the conversations was controlled. Participants were asked to speak one at a time (otherwise the speech recognizer cannot make sense of the speech) and to not disclose any personal or sensitive information. During the group conversation, participants wore the wearable jammer prototype one at a time. The participants were asked to exchange the jammer every minute, so that all could try it for an equal period.

The conversation was recorded using four different commodity smartphones (Samsung S9+, Samsung S7, *Nexus* 6, and Xiaomi Mi 6), one of which was handed to each of the participants at the start of the study. The audio from all of the smartphone recordings was used for speech recognition. After the conversation was conducted, participants were presented with a transcript of the speech recognition (for the smartphone that they had during the study). After reading the transcript, they were asked to rate how much they felt that the jammer had protected their privacy on a Likert scale (1-7). Lastly, it is noted that the baseline of this study is implicit, as participants have a recollection of what they discussed in the group conversation and can judge how much the effect of the jammer influenced their perception of privacy.

To ensure that the English language level of each participant did not negatively reduce the fidelity of the speech recognizer, the candidates for this study were asked to read aloud sample sentences. Candidates who got over 70% accuracy were invited to participate in the study. As a result, 12 participants (aged 18-26 years old; four self-identified as females and eight as males) were selected for this study. Ten of the participants had used some measure of privacy protection before, such as a laptop webcam cover, browser anti-tracking extensions, incognito mode, or VPN service. None of these participants had previously used a microphone jammer.

Participants rated the feeling of privacy induced by the jammer as M=5.4 and SD=1.1. This result, coupled with positive comments, suggested that the bracelet provided a sense of protection for the recorded conversation. While the wearable jammer did not jam the microphones completely in all recordings, the overwhelming majority of the transcripts of the four-minute conversations had only a dozen of mostly erroneous words.

When asked about their experience with the wearable jammer, most participants stated that they felt the jammer was definitely blocking out most words. Additionally, all twelve of the participants stated that they would use the jammer again in the future. When asked specifically about the kinds of situations they would use it for, the participants gave examples of discussing private matters with their doctors, discussing banking information, talking to their employers, etc.

The simulation, experiments, and user study provided insights into the advantages of a wearable microphone jammer. It was found in the experiments that a wearable jammer in a curved layout will outperform stationary jammers or jammers with planar layouts. Furthermore, it was found that the proposed jammer actually provided participants from the user study with a sense of increased privacy against eavesdropping microphones.

However, it is possible that attackers might craft exploits in an effort to circumvent the proposed wearable jammer. The most likely attack would be a noise canceling technique intended to cancel out the jamming signals. To provide validation against this attack, microphone recordings of a jammed signal were de-noised over a speech library (the same library used in the second experiment) using two methods: (1) a deep neural network (DNN) denoising method, and (2) a Wiener filter. No improvement in the denoised speech was noticed (WER 99.64% for the DNN based method, and 100% for the Wiener filter), when compared to the original jammed speech audio (WER 99.64%). It is believed that these current de-noising techniques will be of limited effect because of two key factors of the proposed design. First, randomly changing signals are used, which are hard to predict and cancel out. Second, the motion of the user (i.e., gestures and movements) is also hard to predict, making it extremely difficult to cancel out these moving signal sources. Furthermore, to make it even harder to perform noise canceling of the jamming signals, the proposed jammer can generate signals that exhibit cadence patterns similar to human voice.

As with any of the current ultrasonic jamming techniques (including wearable jamming), it is possible that a jammer could accidentally jam legitimate microphones that happen to be inside the jamming range, including a smartphone of the user, hearing aids, emergency response devices, etc. A user cannot selectively jam devices using ultrasound jamming: e.g., a user cannot choose to avoid jamming his/her own smartphone while still jamming another device. With respect to this consideration, the proposed approach does provide more control than existing stationary jammers. Stationary jammers, once activated will jam their entire range, requiring the user to walk all the way to the jammer to disable it. With the proposed wearable jammer, the user can control the jammer (i.e., activate/deactivate) by simply touching the control on the jammer. For example, the control on the jammer can be a switch, button, touch screen, etc. that allows the user activate and deactivate the device. In one embodiment, the proposed jammer can include an intensity control that allows users to control the frequency of the jamming range. The intensity control can be a knob, series of buttons, touchscreen, etc.

Any of the operations described herein can be implemented in the form of computer-readable instructions that are stored on a tangible computer-readable medium and executable by a processing component. For example, the system can utilize a computer that includes a memory which stores the computer-readable instructions, a processor which executes the stored computer-readable instructions, a transceiver that communicates with other computing devices, and an interface that allows a user to interact with and control the computer. The computer can be incorporated into the wearable jammer, as described herein.

Figure 9:
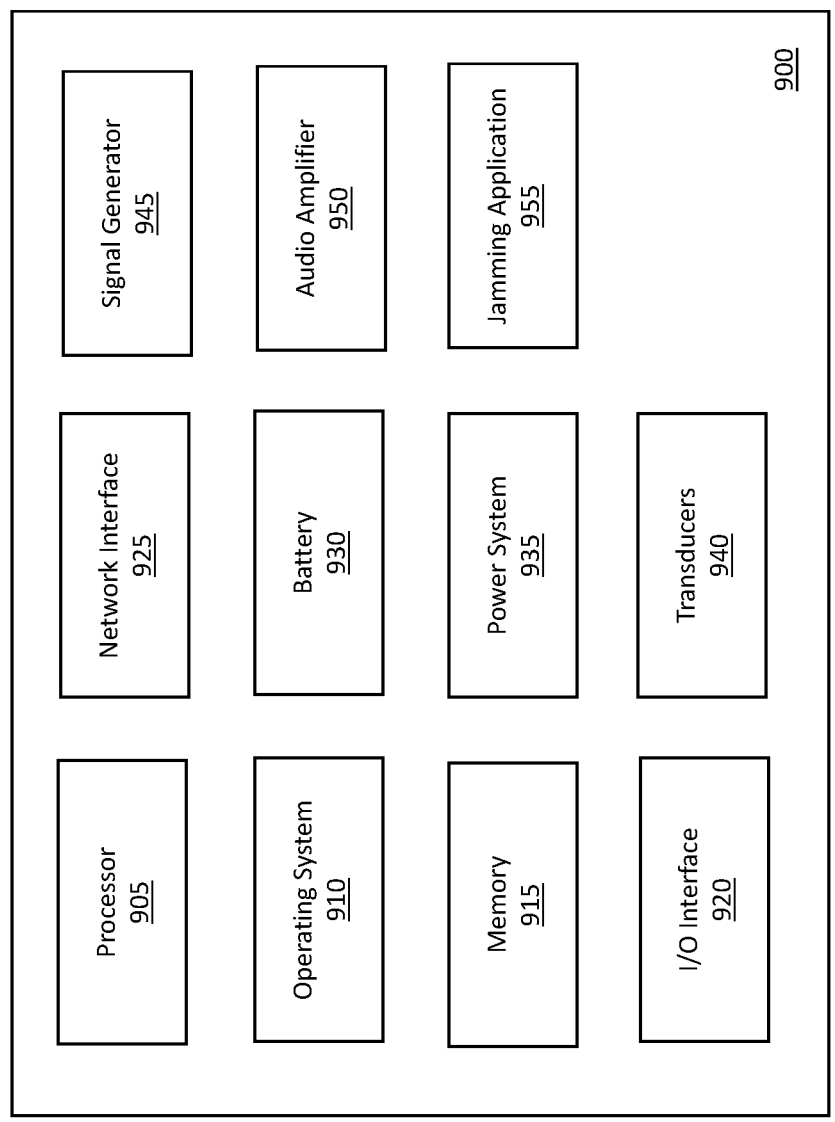
FIG. 9 is a block diagram depicting components of a wearable jammer in accordance with an illustrative embodiment.

FIG. 9 is a block diagram depicting components of a wearable jammer in accordance with an illustrative embodiment. As shown, the wearable jammer includes a base 900, to which is mounted a processor 905, an operating system 910, a memory 915, an I/O interface 920, a network interface 925, a battery 930, a power system 935, transducers 940, a signal generator 945, an audio amplifier 950, and a jamming application 955. In alternative embodiments, the wearable jammer can include fewer, additional, and/or different components. The base 900 can be any of the bases described herein. For example, the base 900 can be in the form of a bracelet, a necklace, a watch, a smart watch, a wrist band, an arm band, an earring, a finger ring, eyeglasses, sunglasses, facial recognition blockers (e.g., radiation blocking glasses), a pin, a clothing button, a hat, a hair tie, a hair barrette, headphones, earbuds, a handbag, a handbag attachment/accessory, or other item of clothing or personal accessory, etc.

In an illustrative embodiment, the various components of the jammer communicate with one another via one or more buses or any other interconnect system known in the art. The processor 905 can be any type of computer processor known in the art, and can include a plurality of processors and/or a plurality of processing cores. The processor 905 can include a controller, a microcontroller, an audio processor, a hardware accelerator, a digital signal processor, etc. Additionally, the processor 905 may be implemented as a complex instruction set computer processor, a reduced instruction set computer processor, an x86 instruction set computer processor, etc. The processor is used to run the operating system 910, which can be any type of operating system.

The operating system 910 is stored in the memory 915, which is also used to store programs, algorithms, network and communications data, peripheral component data, the jamming application 955, and other operating instructions. The memory 915 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc.

The I/O interface 920 is the framework which enables users and peripheral devices to interact with the jammer. The I/O interface 920 can include an on/off switch or other power control, an on/off indicator such as a light, and/or any other components that allow the user to interact with and control the jammer. The I/O interface 920 also includes circuitry and a bus structure to interface with peripheral computing devices such as power sources, USB devices, peripheral component interconnect express (PCIe) devices, serial advanced technology attachment (SATA) devices, high definition multimedia interface (HDMI) devices, proprietary connection devices, etc.

The network interface 925 includes transceiver circuitry that allows the jammer to transmit and receive data to/from other devices such as remote computing systems, servers, websites, etc. The data can include software updates, operating instructions, parameter settings, etc. The network interface 925 also enables communication through a network, which can be one or more communication networks. The network can include a cable network, a fiber network, a cellular network, a wi-fi network, a landline telephone network, a microwave network, a satellite network, etc. The network interface 925 also includes circuitry to allow device-to-device communication such as Bluetooth® communication. In alternative embodiments, the network interface 925 may not be included in the jammer.

The battery 930 is used to power the various components of the jammer, and can be any of the batteries described herein. For example, the battery can be sized at 100 mA, 250 mA, 500 mA, 750 mA, 1000 mA, etc. depending on the specific jammer design. Additionally, in some embodiments, two or more batteries may be used. In another illustrative embodiment, the battery 930 is rechargeable can be a lithium-ion battery, a nickel cadmium battery, a nickel-metal hydride battery, etc. In embodiments where the battery 930 is rechargeable, the power system 935 includes a power regulator, a charging port, and a charge control algorithm to control charging of the battery 930 through a power source that connects to the jammer through the charging port. The power regulator is used to control power to the various components of the jammer. In some embodiments, the power system 935 can include a dedicated memory to store the charge control algorithm. Alternatively, the charge control algorithm may be stored in the memory 915.

The transducers 940, the signal generator 945, the audio amplifier 950, and the jamming application 955 are used to perform any of the jamming operations described herein. As discussed, the transducers 940 can be positioned in one or more circular or curved patterns about the base 900. More specifically, the transducers 940 can be arranged as a linear array, sector array, curvilinear (curved) array, 2-D array (rectangular or annular), phased array (1D or 2D), etc. The transducers 940 can be in the form of a piezoelectric film, an organic piezoelectric film, a conformable piezoelectric array, a piezoelectric ceramic which may be embedded into a polymer, a capacitive micromachined ultrasonic transducer (CMUT), etc. The signal generator 945 can be a sine wave generator in an illustrative embodiment. Alternatively, a different type of signal may be used. As discussed, the signal generator 945 is configured to generate one or more ultrasound jamming signals that can have a wide range of frequencies that are known to coincide with human speech. The audio amplifier 950 is used to amplify the generated signals, and can for example be a three Watt (W) amplifier. Alternatively, a different size of amplifier may be used, such as a 2 W amplifier, a 4 W amplifier, etc. The jamming application 955 can include software in the form of computer-readable instructions which, upon execution by the processor 905, performs any of the various operations described herein such as receiving data, running algorithms, controlling the transducers 940, controlling the signal generator 945, controlling the audio amplifier 950, etc.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

CLAUSES

Clause 1. A microphone jammer comprising:
a base;
a signal generator mounted to the base and configured to generate an ultrasonic signal; and
one or more transducers mounted to the base and configured to transmit the ultrasonic signal, wherein the one or more transducers are mounted in a curved layout about the base.

Clause 2. The microphone jammer of clause 1, wherein the ultrasonic signal comprises a plurality of ultrasonic signals having variable frequency or amplitude.

Clause 3. The microphone jammer of clause 2, further comprising a processor configured to control the signal generator, wherein the processor causes the signal generator to randomly sweep a frequency of a sine wave to generate the plurality of ultrasonic signals.

Clause 4. The microphone jammer of clause 3, wherein the frequency is between 24 kilohertz and 26 kilohertz.

Clause 5. The microphone jammer of clause 3, wherein the processor controls the signal generator to change the frequency once per period of time.

Clause 6. The microphone jammer of clause 5, wherein the period of time comprises 0.45 milliseconds.

Clause 7. The microphone jammer of clause 1, further comprising an indicator light mounted to the base and configured to indicate whether the microphone jammer is activated or deactivated.

Clause 8. The microphone jammer of clause 1, further comprising a control mounted to the base and configured to activate and deactivate the microphone jammer.

Clause 9. The microphone jammer of clause 1, wherein the ultrasonic signal includes a cadence pattern corresponding to a human voice.

Clause 10. The microphone jammer of clause 1, further comprising an intensity control mounted to the base, wherein the intensity control adjusts an intensity of the ultrasonic signal.

Clause 11. The microphone jammer of clause 1, further comprising a mount attached to the base, wherein the mount is configured to attach to a user.

Clause 12. The microphone jammer of clause 11, wherein the mount comprises one or more magnets.

Clause 13. The microphone jammer of clause 11, wherein the mount comprises a pin, an adhesive, an article of clothing, or jewelry.

Clause 14. The microphone jammer of clause 1, wherein the one or more transducers is mounted in a first ring layout and a second ring layout.

Clause 15. The microphone jammer of clause 14, wherein transducers in the first ring layout are staggered relative to transducers in the second ring layout.

Clause 16. A method of forming a microphone jammer, the method comprising:
forming a base;
mounting a signal generator to the base, wherein the signal generator is configured to generate an ultrasonic signal; and
mounting one or more transducers to the base, wherein the one or more transducers are configured to transmit the ultrasonic signal, and wherein one or more transducers are mounted in a curved layout about the base.

Clause 17. The method of clause 16, further comprising mounting the base to a mount that is configured to attach to a user.

Clause 18. The method of clause 16, further comprising mounting an intensity control to the base, wherein the intensity control is configured to control an intensity of the ultrasonic signal.

Clause 19. The method of clause 16, wherein mounting the one or more transducers in a curved layout comprises mounting the one or more transducers in a first curved layout and a second curved layout about the base.

Clause 20. The method of clause 19, further comprising mounting the transducers of the first curved layout such that they are staggered relative to the transducers of the second curved layout.

Clause 21. A wearable microphone jammer comprising:
a base that is configured to attach to a user, an article of clothing, or an accessory;
a signal generator mounted to the base and configured to generate an ultrasonic signal; and
one or more transducers mounted to the base and configured to transmit the ultrasonic signal.

Clause 22. The wearable microphone jammer of clause 21, wherein the ultrasonic signal comprises a plurality of ultrasonic signals having variable frequency or amplitude.

Clause 23. The wearable microphone jammer of clause 22, further comprising a processor configured to control the signal generator, wherein the processor causes the signal generator to randomly sweep a frequency of a sine wave to generate the plurality of ultrasonic signals.

Clause 24. The wearable microphone jammer of clause 21, wherein the base comprises a piece of jewelry.

Clause 25. The wearable microphone jammer of clause 21, wherein the base includes a mount in the form of a pin to attach to the article of clothing or the accessory.

Clause 26. The wearable microphone jammer of clause 21, wherein the base includes a mount in the form of one or more magnets.

What is claimed is:

1. A microphone jammer comprising:
   a base;
   a signal generator mounted to the base and configured to generate a plurality of ultrasonic signals;
   one or more transducers mounted to the base and configured to transmit the plurality of ultrasonic signals, wherein the one or more transducers are mounted in a curved layout about the base; and
   a processor configured to control the signal generator, wherein the processor causes the signal generator to randomly sweep a frequency of a sine wave in increments of 1 Hertz to generate the plurality of ultrasonic signals.

2. The microphone jammer of claim 1, wherein the plurality of ultrasonic signals have variable frequency or amplitude.

3. The microphone jammer of claim 1, wherein the processor controls the signal generator to change the frequency once per period of time.

4. The microphone jammer of claim 3, wherein the period of time comprises 0.45 milliseconds.

5. The microphone jammer of claim 1, further comprising an indicator light mounted to the base and configured to indicate whether the microphone jammer is activated or deactivated.

6. The microphone jammer of claim 1, further comprising a control mounted to the base and configured to activate and deactivate the microphone jammer.

7. The microphone jammer of claim 1, wherein the plurality of ultrasonic signals include a cadence pattern corresponding to a human voice.

8. The microphone jammer of claim 1, further comprising a mount attached to the base, wherein the mount is configured to attach to a user.

9. The microphone jammer of claim 8, wherein the mount comprises a pin, an adhesive, an article of clothing, or jewelry.

10. The microphone jammer of claim 1, wherein the one or more transducers is mounted in a first ring layout and a second ring layout.

11. The microphone jammer of claim 10, wherein transducers in the first ring layout are staggered relative to transducers in the second ring layout.

12. A method of forming a microphone jammer, the method comprising:
    forming a base;
    mounting a signal generator to the base, wherein the signal generator is configured to generate a plurality of ultrasonic signals;
    mounting one or more transducers to the base, wherein the one or more transducers are configured to transmit the plurality of ultrasonic signals, and wherein one or more transducers are mounted in a curved layout about the base; and
    controlling, by a processor, the signal generator to randomly sweep a frequency of a sine wave in increments of 1 Hertz to generate the plurality of ultrasonic signals.

13. The method of claim 12, further comprising mounting the base to a mount that is configured to attach to a user.

14. The method of claim 12, further comprising mounting an intensity control to the base, wherein the intensity control is configured to control an intensity of the plurality of ultrasonic signals.

15. The method of claim 12, wherein mounting the one or more transducers in a curved layout comprises mounting the one or more transducers in a first curved layout and a second curved layout about the base.

16. The method of claim 15, further comprising mounting the transducers of the first curved layout such that they are staggered relative to the transducers of the second curved layout.

17. A wearable microphone jammer comprising:
    a base that is configured to attach to a user, an article of clothing, or an accessory;
    a signal generator mounted to the base and configured to generate a plurality of ultrasonic signals;
    one or more transducers mounted to the base and configured to transmit the plurality of ultrasonic signals; and
    a processor configured to control the signal generator, wherein the processor causes the signal generator to randomly sweep a frequency of a sine wave in increments of 1 Hertz to generate the plurality of ultrasonic signals.

18. The wearable microphone jammer of claim 17, wherein the plurality of ultrasonic signals have variable frequency or amplitude.

* * * * *